United States Patent
Buddemeier et al.

(10) Patent No.: US 6,876,364 B2
(45) Date of Patent: Apr. 5, 2005

(54) METHOD FOR MAPPING FACIAL ANIMATION VALUES TO HEAD MESH POSITIONS

(75) Inventors: Ulrich F. Buddemeier, Venice, CA (US); Karin M. Derlich, Culver City, CA (US); Hartmut Neven, Santa Monica, CA (US)

(73) Assignee: Vidiator Enterprises Inc., New Providence (BS)

( * ) Notice: Subject to any disclaimer, the term of this patent is extended or adjusted under 35 U.S.C. 154(b) by 226 days.

(21) Appl. No.: 10/216,662

(22) Filed: Aug. 9, 2002

(65) Prior Publication Data

US 2003/0043153 A1 Mar. 6, 2003

Related U.S. Application Data

(63) Continuation-in-part of application No. 09/929,823, filed on Aug. 13, 2001.

(51) Int. Cl.$^7$ .............................................. G06T 13/00
(52) U.S. Cl. ..................................................... 345/473
(58) Field of Search .............................. 345/473, 629, 345/419; 382/100, 107, 155, 224; 706/2.52

(56) References Cited

U.S. PATENT DOCUMENTS

| | | |
|---|---|---|
| 4,725,824 A | 2/1988 | Yoshioka |
| 4,805,224 A | 2/1989 | Koezuka et al. |
| 4,827,413 A | 5/1989 | Baldwin et al. |
| 5,159,647 A | 10/1992 | Burt |
| 5,168,529 A | 12/1992 | Peregrim et al. |
| 5,187,574 A | 2/1993 | Kosemura et al. |
| 5,220,441 A | 6/1993 | Gerstenberger |
| 5,280,530 A | 1/1994 | Trew et al. |
| 5,333,165 A | 7/1994 | Sun |
| 5,383,013 A | 1/1995 | Cox |
| 5,430,809 A | 7/1995 | Tomitaka |
| 5,432,712 A | 7/1995 | Chan |
| 5,511,153 A | 4/1996 | Azarbayejani et al. |
| 5,533,177 A | 7/1996 | Wirtz et al. |
| 5,550,928 A | 8/1996 | Lu et al. |
| 5,581,625 A | 12/1996 | Connell |
| 5,588,033 A | 12/1996 | Yeung |
| 5,680,487 A | 10/1997 | Markandey |
| 5,699,449 A | 12/1997 | Javidi |
| 5,714,997 A | 2/1998 | Anderson |

(Continued)

FOREIGN PATENT DOCUMENTS

| | | |
|---|---|---|
| DE | 4406020 C1 | 6/1995 |
| EP | 0807902 A2 | 11/1997 |
| WO | WO99/53443 | 10/1999 |

OTHER PUBLICATIONS

International Search Report for PCT/US99/07935.
Akimoto, T., et al., "Automatic Creation of Facial 3D Models", IEEE Computer Graphics & Apps., pp. 16–22, Sep. 1993.

(Continued)

*Primary Examiner*—Mark Zimmerman
*Assistant Examiner*—Lance W. Sealey
(74) *Attorney, Agent, or Firm*—Seed IP Law Group PLLC

(57) ABSTRACT

The present invention provides a technique for translating facial animation values to head mesh positions for rendering facial features of an animated avatar. In the method, an animation vector of dimension $N_a$ is provided. $N_a$ is the number of facial animation values in the animation vector. A mapping algorithm F is applied to the animation vector to generate a target mix vector of dimension M. M is the number of targets associated with the head mesh positions. The head mesh positions are deformed based on the target mix vector.

14 Claims, 1 Drawing Sheet

U.S. PATENT DOCUMENTS

| | | | |
|---|---|---|---|
| 5,715,325 | A | 2/1998 | Bang et al. |
| 5,719,954 | A | 2/1998 | Onda |
| 5,736,982 | A | 4/1998 | Suzuki et al. |
| 5,764,803 | A | 6/1998 | Jacquin et al. |
| 5,774,591 | A | 6/1998 | Black et al. |
| 5,802,220 | A | 9/1998 | Black et al. |
| 5,809,171 | A | 9/1998 | Neff et al. |
| 5,828,769 | A | 10/1998 | Burns |
| 5,917,937 | A | 6/1999 | Szeliski et al. |
| 5,982,853 | A | 11/1999 | Liebermann |
| 5,995,119 | A | 11/1999 | Cosatto et al. |
| 6,011,562 | A | 1/2000 | Gagne et al. |
| 6,044,168 | A | 3/2000 | Tuceryan et al. |
| 6,052,123 | A | 4/2000 | Lection et al. |
| 6,307,576 | B1 | 10/2001 | Rosenfield ............... 345/956 |
| 6,351,269 | B1 * | 2/2002 | Georgiev .................. 345/629 |
| 6,504,546 | B1 | 1/2003 | Cosatto et al. ............ 345/473 |
| 6,600,491 | B1 | 7/2003 | Szeliski et al. ........... 345/473 |
| 6,611,268 | B1 | 8/2003 | Szeliski et al. ........... 345/473 |
| 6,654,018 | B1 | 11/2003 | Cosatto et al. ............ 345/473 |

OTHER PUBLICATIONS

Ayache, N. et al., "Rectification of Images for Binocular and Trinocular Stereovision", Proc. Of 9th Int'l., Conference on Pattern Recognition, 1, pp. 11–16, Italy, 1988.

Belhumeur, P., "A Bayesian Approach to Binocular Stereopsis", *Int'l. J. Of Computer Vision*, 19 (3), pp. 237–260, 1996.

Beymer, D. J., "Face Recognition Under Varying Pose", MIT A.I. Lab, Memo No. 1461,pp. 1–13, 12/93.

Beymer, D.J., "Face Recognition Under Varying Pose", MIT A.I. Lab. Research Report, 1994, pp. 756–761.

Buhmann, J. et al., "Distortion Invariant Object Recognition By Matching Hierarchically Labeled Graphs", In Proceedings LICNN Int'l Conf. Of Neural Networks, Washington, D.C. Jun. 1989, pp. 155–159.

DeCarlo, D., et al., "The integration of Optical Flow and Deformable Models with Applications to Human Face Shape and Motion Estimation", pp. 1–15, In Proc. CVPR '96, pp. 231–238 (published)[TM 18.9.96].

Devemay, F. et al., "Computing Differential Properties of 3–D Shapes from Steroscopic Images without {3–D} Models", INRIA, RR–2304, pp. 1–28, Sophia, Antipolis, 1994.

Dhond, U., "Structure from Stereo: a Review", IEEE Transactions on Systems, Man, and Cybernetics, 19(6), pp. 1489–1510, 1989.

Fleet, D.J., et al., "Computation of Component Image Velocity from Local Phase Information", *Int., J. Of Computer Vision*, 5:1, pp. 77–104 (1990).

Fleet, D.J., et al. *Measurement of Image Velocity*, Kluwer Academic Press, Boston, pp. 1–203, 1992.

Hall, E.L., "Computer Image Processing And Recognition", Academic Press 1979, 99. 468–484.

Hong, H.,et al., "Online Facial Recognition based on Personalized Gallery", Proceedings of Int'l Conference On Automatic Face And Gesture Recognition, pp. 1–6, Japan Apr. 1997.

Kolocsai, P., et al, Statistical Analysis of Gabor–Filter Representation, *Proceedings of International Conference on Automatic Face and Gesture Recognition, 1997*, 4 pp.

Kruger, N., "Visual Learning with a priori Constraints", *Shaker Verlag*, Aachen, Germany, 1998, pp. 1–131.

Kruger, N., et al., "Principles of Cortical Processing Applied to and Motivated by Artificial Object Recognition", Institut fur Neuroinformatik, *Internal Report 97–17*, Oct. 97, pp. 1–12.

Kruger, N., et al, "Autonomous Learning of Object Representations Utilizing Self–Controlled Movements", 1998, *Proceedings of NN98*, 5 pp.

Kruger, N., et al, "Object Recognition with a Sparse and Autonomously Learned Representation Based on Banana Wavelets", *Internal Report 96–11*, Institut fur Neuroinformatik, Dec. 96, pp. 1–24.

Kruger, N., et al, "Object Recognition with Banana Wavelets", *European Symposium on Artificial Neural Networks* (ESANN97), 1997, 6 pp.

Kruger, N., "An Algorithm for the Learning of Weights in Discrimintion Functions Using a priori Constraints", *IEEE Transactions on Pattern Analysis and Machine Intelligence*, vol. 19, No. 7, Jul. 197, pp. 764–768.

Lades, M., et al, "Distortion Invarient Object Recognition in the Dynamic Link Architecture", *IEEE Transactions on Computers*, vol. 42, No. 3, 1993, 11 pp.

Luong, Q. T., et al, "The Fundamental Matrix, Theory, Algorithm, and Stability Analysis", *INRIA*, 1993, pp. 1–46.

Manjunath, B. S., et al, "A Feature Based Approach to Face Recognition", *In Proceedings IEEE Conference on Computer Vision and Pattern Recognition*, pp. 373–378, 3/92.

Mauer, T., et al, "Single–View Based Recognition of Faces Rotated in Depth". In *Proceedings of the International Workshop on Automatic Face and Gesture Recognition*, pp. 248–253, Zurich, CH, Jun. 26, 1995.

Mauer, T., et al, "Learning Feature Transformations to Recognize Faces Rotated in Depth", In *Proceedings of the International Conference on Artificial Neural Networks*, vol. 1, pp. 353–358, Paris, France, Oct. 9–13, 1995.

Mauer, T., et al, "Tracking and Learning Graphs and Pose on Image Sequences of Faces", *Proceedings of 2nd International Conference on Automatic Face and Gesture Recognition*, Oct. 14–16, 1996, pp. 176–181.

Maybank, S. J., et al, "A Theory of Self–Calibration of a Moving Camera", *International Journal of Computer Vision*, 8(2), pp. 123–151, 1992.

McKenna, S.J., et al, Tracking Facial Feature Points With Gabor Wavelets and Shape Models (publication & date unknown), 6 pp.

Okada, K., et al, "The Bochum/USC Face Recognition System", 19 pp. (publication & date unknown).

Okutomi, M., et al, "A Multiple–Baseline Stereo", *IEEE Trans. on Pattern Analysis and Machine Intelligence*, vol. 15, No. 4, pp. 353–363, Apr. 1993.

Peters, G., et al, "Learning Object Representations by Clustering Banana Wavelet Responses", *Tech. Report IR–INI 96–09*, Institut fur Neuroinformatik, Ruhr Universitat, Bochum, 1996, 6 pp.

Phillips, P. J., et al, "The Face Recognition Technology (FERET) Program", *Proceedings of Office of National Drug Control Policy*, CTAC International Technology Symposium, Aug. 18–22, 1997, 10 pages.

Pighin, F. et al, "Synthesizing Realistic Facial Expressions from Photographs", In *SIGGRAPH 98 Conference Proceedings*, pp. 75–84, Jul. 1998.

Roy, S., et al, "A Maximum Flow Formulation of the N–Camera Stereo Correspondence Problem", *IEEE, Proceedings of International Conference on Computer Vision*, Bombay, India, Jan. 1998, pp. 1–6.

Sara, R. et al "3–D Data Acquisition and Interpretation for Virtual Reality and Telepresence", *Proceedings IEEE Workshop Computer Vision for Virtual Reality Based Human Communication*, Bombay, Jan. 1998, 7 pp.

Sara, R. et al "Fish–Scales: Representing Fuzzy Manifolds", *Proceedings International Conference Computer Vision*, ICCV '98, pp. 811–817, Bombay, Jan. 1998.

Sara, R., et al, "On Occluding Contour Artifacts in Stereo Vision", *IEEE, Proceedings of International Conference Computer Vision and Pattern Recognition*, Puerto Rico, 1997, 6 pp.

Steffens, J., et al, "PersonSpotter—Fast and Robust System for Human Detection, Tracking, and Recognition", *Proceedings of International Conference on Automatic Face and Gesture Recognition*, 6 pp., Japan—Apr. 1998.

Theimer, W. M., et al, "Phase–Based Binocular Vergence Control and Depth Reconstruction using Active Vision", *CVGIP: Image Understanding*, vol. 60, No. 3, Nov. 1994, pp. 343–358.

Notification of Transmittal of the International Search Report or the Declaration, International Search Report for PCT/US02/23973, mailed Nov. 18, 2002.

Valente, Stephanie et al., "A Visual Analysis/Synthesis Feedback Loop for Accurate Face Tracking", Signal Processing Image Comunication, Elsevier Science Publishers, vol. 16, No. 6, Feb. 2001, pp. 585–608.

Yang, Tzong Jer, "Face Analysis and Synthesis", Jun. 1, 1999, Retrieved from Internet, http://www.cmlab.csie.ntu.edu.tw/ on Oct. 25, 2002, 2 pg.

Yang, Tzong Jer, "VR–Face: An Operator Assisted Real–Time Face Tracking System", Communication and Multimedia Laboratory, Dept. of Computer Science and Information Engineering, National Taiwan University, Jun. 1999, pp. 1–6.

Tomasi, C., et al., "Stereo Without Search", *Proceedings of European Conference on Computer Vision*, Cambridge, UK, 1996, 14 pp. (7 sheets).

Triesch, J., et al, "Robust Classification of Hand Postures Against Complex Backgrounds", *Proceedings of the Second International Conference on Automatic Face and Gesture Recognition*, Killington, VT, Oct. 1996, 6 pp.

Turk, M., et al, "Eigenfaces for Recognition", *Journal of Cognitive Neuroscience*, vol. 3, No. 1, pp. 71–86, 1991.

Wiskott, L., et al, "Face Recognition and Gender Determination", *Proceedings of International Workshop on Automatic Face and Gesture Recognition*, pp. 92–97, Zurich CH, Jun. 26, 1995.

Wiskott, L., et al, "Face Recognition by Elastic Bunch Graph Matching", *Internal Report, IR–INI 96–08*, Institut fur Neuroinformatik, Ruhr–Universitat, Bochum, pp. 1–21, Apr. 1996.

Wiskott, L., "Labeled Graphs and Dynamic Link Matching for Face Recognition and Scene Analysis", *Verlag Harr Deutsch*, Thun–Frankfurt am Main. Reihe Physik, Dec. 1995, pp. 1–109.

Wiskott, L., "Phantom Faces for Face Analysis". *Proceedings of 3rd Joint Symposium on Neural Computation*, Pasadena, CA, vol. 6, pp. 46–52. Jun. 1996.

Wiskott, L., "Phantom Faces for Face Analysis". *Internal Report, IR–INI 96–06*, Institut fur Neoroinformatik, Ruhr–Universitat, Bochum, Germany, Apr. 1996, 12 pp.

Wiskott, L. "Phantom Faces for Face Analysis", *Pattern Recognition*, vol. 30, No. 6, pp. 837–846, 1997.

Wiskott, L., et al, "Face Recognition by Elastic Bunch Graph Matching", *IEEE Transactions on Pattern Analysis and Machine Intelligence*, 19(7), pp. 775–779, 1997.

Wong, R., et al, "PC–Based Human Face Recognition System", *IEEE*, pp. 641–644, 1992.

Wurtz, R., "Object Recognition Robust Under Translations, Deformations, and Changes in Background", *IEEE Transactions on Patern Analysis and Machine Intelligence*, vol. 19, No. 7, Jul. 1997, pp. 769–775.

Wurtz, R., et al, "Corner Detection in Color Images by Multiscale Combination of End–stopped Cortical Cells", *Artificial Neural Networks—ICANN '97*, Lecture Notes in Computer Science, vol. 1327, pp. 901–906, Springer–Verlag, 1997.

Yao, Y., et al, "Tracking a Dynamic Set of Feature Points", *IEEE Transactions on Image Processing*, vol. 4, No. 10, Oct., 1995, pp. 1382–1394.

* cited by examiner

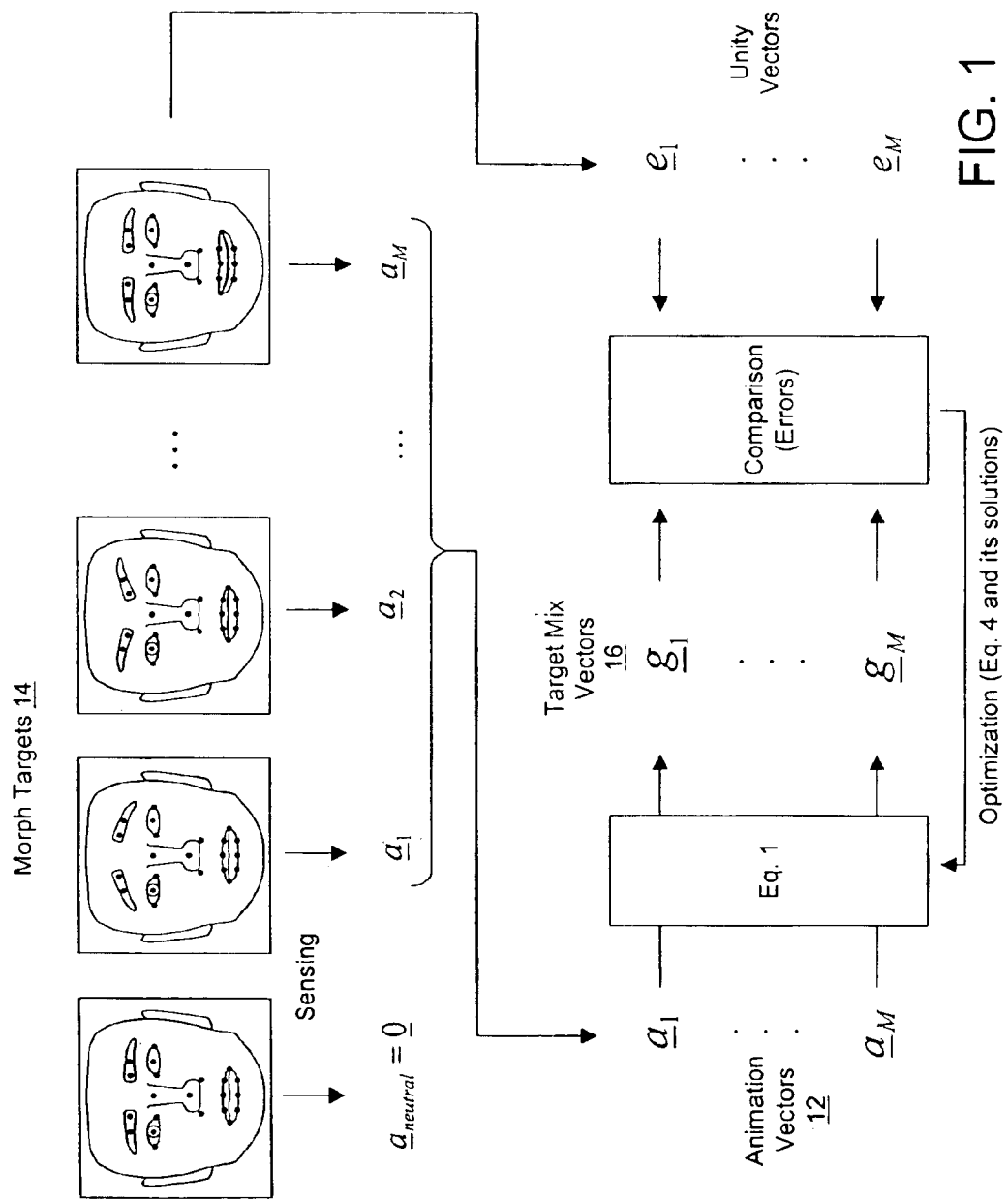

METHOD FOR MAPPING FACIAL ANIMATION VALUES TO HEAD MESH POSITIONS

RELATED APPLICATION DATA

Priority is claimed as a continuation-in-part of U.S. application Ser. No. 09/929,823 filed Aug. 13, 2001, which is incorporated herein by this reference.

BACKGROUND OF THE INVENTION

The present invention relates to head animation, and more particularly, to generating an animated three-dimensional video head.

Virtual spaces filled with avatars are an attractive way to allow for the experience of a shared environment. However, animation of a photo-realistic avatar generally requires intensive graphic processes, particularly for rendering facial features.

Accordingly, there exists a significant need for improved rendering of facial features. The present invention satisfies this need.

SUMMARY OF THE INVENTION

The present invention provides a technique for for translating facial animation values to head mesh positions for rendering facial features of an animated avatar. In the method, an animation vector $\underline{a}$ of dimension $N_a$ is provided. $N_a$ is the number of facial animation values in the animation vector. A mapping algorithm F is applied to the animation vector to generate a target mix vector $\underline{g}$ of dimension M. M is the number of targets associated with the head mesh positions. The head mesh positions are deformed based on the target mix vector $\underline{g}$.

In more detailed features of the invention, the animation vector may be determined by sensing facial features, associated with independent targets, of a human subject. Alternatively, the animation vector is obtained by applying facial feature position sensing to annotated vertices on a model. The targets may comprise independent targets and dependent targets. The dependent targets may be generated by linear superposition of vertex coordinates of the independent targets.

A calibration vector $\underline{c}$ may be applied to the target mix vector $\underline{g}$ to generate a calibrated target mix vector $\underline{g}_c$. The head mesh positions are then deformed based on the calibrated target mix vector.

Groups that associate sets of the animation values with sets of targets may be defined. The mapping algorithm F may be independently applied to each grouped set of animation values to generate corresponding target mix group-vectors. The target mix group-vectors may be combined to generate the target mix vector $\underline{g}$ of dimension M, where M is the number of targets associated with the head mesh positions; and Other features and advantages of the present invention should be apparent from the following description of the preferred embodiments taken in conjunction with the accompanying drawings, which illustrate, by way of example, the principles of the invention.

BRIEF DESCRIPTION OF THE DRAWINGS

FIG. 1 is a schematic flow diagram showing a technique for translating an animation vector to a target mix vector, according with the invention.

DETAILED DESCRIPTION OF THE PREFERRED EMBODIMENTS

The present invention provides a technique for translating an animation vector to a target mix vector. With reference to FIG. 1, the animation of an avatar is defined by a set of morph targets 14. Each morph target may represent a facial expression. The morph targets in FIG. 1 represent, from left to right, a neutral facial expression, a surprised facial expression, an angry facial expression, and a smiling facial expression. A mapping algorithm provides the translation from the animation vector 12 to target mix vector 16.

The animation vector is an abstracted sensing result and is a most compact representation of the facial expression as determined by audio-visual sensing. By definition, the animation vector is zero for the neutral facial expression, shown by the first morph target. The target mix vector describes the contribution of each individual target to the current expression.

Different mapping algorithms may be used for mapping the animation vectors to the target mix vectors. The common goal of the mapping algorithms is to provide a reasonable interpolation between the points in animation space associated with the targets. Each mapping algorithm is exactly defined by a set of parameters. The parameters vary from algorithm to algorithm.

Calibration may be performed by multiplying the target mix vector with a diagonal matrix. Since the matrix is diagonal, it is henceforth referred to as the calibration vector. The calibration vector may be eliminated if the head model driven by the target mix vector is derived from the same human actor used to obtain the animation vector.

An overview of the translation from animation vector to target mix vector follows. Be $\underline{a}$ the animation vector of dimension $N_a$ (number of animation values), $\underline{g}$ the target mix vector of dimension M (number of independent targets) and $p_1, \ldots, p_L$ the parameters of mapping algorithm $\underline{F}(\ )$, then $$\underline{g} = \underline{F}(\underline{a}, p_1, \ldots, p_L) \qquad (1)$$

The calibrated target mix vector is obtained by multiplying with the diagonal matrix defined by the calibration vector $\underline{c}$:

$$\underline{g}_c = \begin{pmatrix} c_1 & & & \\ & c_2 & & \\ & & \ldots & \\ & & & c_M \end{pmatrix} \cdot \underline{g} \qquad (2)$$

Further, be $\underline{t}_1, \ldots, \underline{t}_M$ the parameterization of the targets associated with the components of the target mix vector and $\underline{t}_0$ the parameterization of the neutral model, then the parameterization of the current expression can be obtained by a simple matrix multiplication:

$$\underline{t} = (\underline{t}_1 - \underline{t}_0\ \underline{t}_2 - \underline{t}_0 \ldots \underline{t}_M - \underline{t}_0) \cdot \underline{g}_c + \underline{t}_0 \qquad (3)$$

The matrix $(\underline{t}_1 - \underline{t}_0\ \underline{t}_2 - \underline{t}_0 \ldots \underline{t}_M - \underline{t}_0)$ is referred to as the target matrix $\overline{\overline{T}}$.

A description of the mapping algorithm follows. Every target $t_i$ is associated with an animation vector $\underline{a}_i$. The target and animation vectors are connected by this deliberate association only. This will become apparent in the formulas, where targets enter only as the i-th unity vector $\underline{e}_i$ representing the target mix vector that results in exactly that target. The parameterization of the target $\underline{t}_1$ is not relevant for computation of the mapping parameters. (This means that is does not matter if the target is defined by vertex positions, morph link positions or muscle tensions.)

The animation vector can be set manually or it can be derived from a reference model with targets, if the model is equipped with ground truth anchors that enable the application of the sensing algorithm to the model and it's deformations AND if the reference model implements all needed targets. The reference model must have a human geometry, since the purpose of the ground truth anchors is to simulate tracking on the model. Manual editing is necessary if the animation vector contains elements that cannot be derived from visual sensing, such as lip synch animation values.

The mapping is basically a multidimensional interpolation in $\underline{a}$ between the target points. The mapping parameters are determined by minimizing the error in reproducing the target points. Depending on the mapping algorithm, perfect reproduction of the target points may not be possible.

The parameters $p_1, \ldots, p_L$ of the mapping are determined by solving the set of equations $$\frac{\partial}{\partial p_j} \sum_{i=1}^{M} \|\underline{e}_i - \underline{F}(\underline{a}_i, p_1, \ldots, p_L)\|^2 = 0, \forall j \in [1, L] \quad (4)$$

where $\underline{e}_i$ is a unity vector representing exact reproduction of the target points.

Targets can be divided into independent groups of targets, such as eye region targets and mouth region targets. Different mapping algorithms can be applied to the different groups to achieve more flexibility.

A description of types of mapping algorithms follow. The simplest mapping algorithm is the linear mapping:

$$\underline{F}(\underline{a},\underline{\underline{P}}) = \underline{\underline{P}} \cdot \underline{a} \quad (5)$$

The parameter matrix is determined by solving the equation $$\underline{\underline{P}} \cdot (\underline{a}_1 \, \underline{a}_2 \ldots \underline{a}_M) = \underline{\underline{1}} \quad (6)$$

using singular value decomposition (SVD). If $N_a < M$, the equation (6) is overdetermined and SVD will return the "solution" that satisfies eq. (4). If $N_a > M$, the equation is underdetermined and the SVD solution will be the vector with the smallest norm that satisfies equation (6). Representative SVD techniques are described in great detail in "Numerical Recipes in C, the Art of Scientific Computing", William H. Press et al., Cambridge University Press, second edition 1993.

A more general mapping is achieved by using a set of basis functions as input. Obviously, the linear method is a special case of this more general method.

$$\underline{F}(\underline{a},\underline{\underline{P}}) = \underline{\underline{P}} \cdot \underline{B}(\underline{a}) \quad (7)$$

The solution is analog to the solution of the linear problem. Since the number of basis functions is independent of the number of animation values $N_a$, it is always possible to choose exactly M functions, so that the system is neither over- or underdetermined:

$$\underline{\underline{P}} = (\underline{B}(\underline{a}_1) \, \underline{B}(\underline{a}_2) \ldots \underline{B}(\underline{a}_M))^{-1} \quad (8)$$

The basis functions can be chosen manually by carefully analyzing the animation vectors of the participating targets. It is very tedious to design a basis function manually such that it only responds when the associated target is acted and not responds when any other target is acted. Off-diagonal elements of the P matrix lead to corrections and decouple the targets such that this desired behavior is achieved.

The target matrix, calibration matrix and mapping parameter matrix can be combined into one matrix by simple multiplication, which can be done ahead of time:

$$t = \underline{\underline{T}} \cdot \underline{g}_c + \underline{t}_0 = \underline{\underline{T}} \cdot \begin{pmatrix} c_1 & & & \\ & c_2 & & \\ & & \ldots & \\ & & & c_M \end{pmatrix} \cdot \underline{\underline{P}} \cdot \underline{B}(\underline{a}) = \underline{\underline{D}} \cdot \underline{B}(\underline{a}) + \underline{t}_0 \quad (9)$$

$$\underline{\underline{D}} = \underline{\underline{T}} \cdot \begin{pmatrix} c_1 & & & \\ & c_2 & & \\ & & \ldots & \\ & & & c_M \end{pmatrix} \cdot \underline{\underline{P}}$$

The decoder matrix D, offset vector (neutral target) $\underline{t}_0$ and definition of basis functions $\underline{\underline{B}}(\underline{a})$ are the most compact representation of the algorithm parameters.

A description of radial/angular basis function mapping follows. The basis functions can also be a set of automatically determined functions such as radial basis functions. Certain properties of the mapping algorithm can be designed into the basis functions. A desirable property of the algorithm is scale linearity:

$$\underline{F}(\lambda \underline{a}) = \lambda \underline{F}(\underline{a}) \quad (10)$$

This means that the "amplitude" of an expression is translated linearly to the model. It can be obtained by using basis functions of the form $$b_i(\underline{a}) = \frac{\|\underline{a}\|}{\|\underline{a}_i\|} \tilde{b}_i \left( \left\| \frac{\underline{a}}{\|\underline{a}\|} - \frac{\underline{a}_i}{\|\underline{a}_i\|} \right\| \right) \quad (11)$$

Because of their linear or locally linear behavior, the following functions are useful for $\tilde{b}\,(\partial)$:

$$\tilde{b}(\partial) = \partial \text{ (preferred)} \quad (12)$$

$$\tilde{b}(\vartheta) = \frac{1}{\alpha} \arctan(\alpha \vartheta) \quad (13)$$

$$\tilde{b}(\vartheta) = \frac{\vartheta}{1 + \alpha \vartheta} \quad (14)$$

Equations (13) and (14) can be locally approximated by Equation (12) and have interesting saturation characteristics. The parameter $\alpha$ determines the localization of these basis functions.

All mapping algorithms are somewhat arbitrary because of their nature as interpolation algorithms. The way interpolation is done between targets is determined by the choice of basis functions. It seems to be reasonable to shoot for the algorithm that delivers the most linear interpolation possible while still reproducing all targets.

If the basis functions are determined automatically, it is easily possible to add K dependent targets that are created by linear superposition of independent targets. This enables one to have more control over the interpolation process by providing additional support points. Eq. (4) is then generalized to:

$$\frac{\partial}{\partial p_j}\sum_{i=1}^{M+K}\|\underline{g}_i - \underline{F}(\underline{a}_i, p_1, \ldots, p_L)\|^2 = 0 \ \forall \ j \in [1, L]; \underline{g}_i = \underline{e}_i \forall \ i \le M \quad (15)$$

Each dependent target is defined by its animation vector $\underline{a}_i$ and target mix vector $\underline{g}_i$ with $i>M$, which defines the superposition of independent targets. Eq. (8) has to be modified to yield the solution to this more general problem:

$$\underline{P}=(\underline{g}_1 \ \underline{g}_2 \ldots \underline{g}_{M+K})\cdot(\underline{B}(\underline{a}_1) \ \underline{B}(\underline{a}_2) \ldots \underline{B}(\underline{a}_{M+K}))^{31 \ 1} \quad (16)$$

A human anatomy reference model with targets $t_i$ is created. The vertices that correspond to tracking (motion capture) nodes are annotated. The displacement of these annotated vertices relative to the neutral model are used to compute the animation vector $a_i$ for each target. Alternatively, the animation vectors can be obtained by applying tracking to a human actor who performs expressions that are equivalents to all of the targets. This will remove the need to annotate certain vertices.

Advantageously, 8 to 22 (or more) facial tracking nodes may be used to define and animate mouth, eyes, eyebrows, nose and head angle. The components of the animation vector may be displacement values relative to neutral face values, either of the tracking node coordinates directly or of combinations of tracking nodes, such as the distance between nodes or linear combinations of node coordinates. Representative facial components of the animation vector for the mouth may include vertical mouth position, horizontal mouth position, mouth width, lip distance, and mouth corner positions (left and right).

Optionally, groups are defined which consist of a selection of certain components of the animation vector and certain targets. (Example: All components of the animation vector describing the mouth and all targets containing mouth expressions) The algorithm can then be applied independently to each group.

Having obtained the associations $(a_i, t_i)$ for all targets, the algorithm parameters are determined by the process described above. Our preferred implementation uses the mapping according to Eq. (7) with basis functions according to Eqs. (11) and (12).

Morphing of a texture map on a deformed three-dimensional head mesh is described in U.S. Pat. No. 6,272,231, titled WAVELET-BASED FACIAL MOTION CAPTURE FOR AVATAR ANIMATION. Imaging systems for acquiring images and image mapping are described in U.S. patent application Ser. No. 09/724,320, titled METHOD AND APPARATUS FOR RELIEF TEXTURE MAP FLIPPING. The entire disclosures of U.S. Pat. No. 6,272,231 and U.S. patent application Ser. No. 09/724,320 are incorporated herein by reference.

Although the foregoing discloses the preferred embodiments of the present invention, it is understood that those skilled in the art may make various changes to the preferred embodiments without departing from the scope of the invention. The invention is defined only by the following claims.

What is claimed is:

1. A method for translating facial animation values to head mesh positions for rendering facial features of an animated avatar, the method comprising:
   providing an animation vector $\underline{a}$ of dimension $N_a$, where $N_a$ is a number of facial animation values in the animation vector;
   applying a mapping algorithm $\underline{F}$ to the animation vector to generate a target mix vector $\underline{g}$ of dimension M, where $\underline{M}$ is a number of targets associated with the head mesh positions;
   applying a calibration vector $\underline{c}$ to the target mix vector $\underline{g}$ to generate a calibrated target mix vector $\underline{g}_c$; and
   deforming the head mesh positions based on the calibrated target mix vector $\underline{g}_c$.

2. A method as defined in claim 1, wherein the targets include independent targets and dependent targets, wherein the dependent targets are generated by linear superposition of vertex coordinates of the independent targets.

3. A method as defined in claim 1, wherein the animation vector is determined by sensing facial features, associated with independent targets, of human subject.

4. A method as defined in claim 1, wherein the animation vector is obtained by applying facial feature position sensing to annotated vertices on a model.

5. A method for translating facial animation values to head mesh positions for rendering facial features of an animated avatar, the method comprising:
   providing an animation vector $\underline{a}$ of dimension $N_a$ where $N_a$ is a number of facial animation values in the animation vector;
   defining groups that associate sets of the animation values with sets of targets;
   applying a mapping algorithm F independently to each grouped set of animation values to generate corresponding target mix group-vectors;
   combining the target mix group-vectors to generate a target mix vector $\underline{g}$ of dimension M, where M is a number of targets associated with the head mesh positions; and
   deforming the head mesh position based on the target mix vector $\underline{g}$.

6. A method as defined in claim 5, wherein the targets include independent targets and dependent targets, wherein the dependent targets are generated by linear superposition of vertex coordinates of the independent targets.

7. A system for translating facial animation value to head mesh positions for rendering facial features of an animated avatar, the system comprising:
   means for providing an animation vector $\underline{a}$ of dimension $N_a$, where $N_a$ is a number of facial animation values in the animation vector;
   means for applying a mapping algorithm $\underline{F}$ to the animation vector to generate a target mix vector $\underline{g}$ of dimension M, where $\underline{M}$ is a number of targets associated with the head mesh positions;
   means for applying a calibration vector $\underline{c}$ to the target mix vector $\underline{g}$ to generate a calibrated target mix vector $\underline{g}_c$; and
   means for deforming the head mesh positions based on the calibrated target mix vector $\underline{g}_c$.

8. An article of manufacture, comprising:
   a machine-readable medium having instructions stored thereon that are executable by a processor to translate facial animation values to head mesh positions for rendering facial features of an animated avatar, by:
   obtaining an animation vector $\underline{a}$ of dimension $N_a$, where $N_a$ is a number of facial animation values in the animation vector;
   applying a mapping algorithm $\underline{F}$ to the animation vector to generate a target mix vector $\underline{g}$ of dimension M, where $\underline{M}$ is a number of targets associated with the head mesh positions;
   applying a calibration vector $\underline{c}$ to the target mix vector $\underline{g}$ to generate a calibrated target mix vector $\underline{g}_c$; and
   deforming the head mesh positions based on the calibrated target mix vector $\underline{g}_c$.

9. The article of manufacture of claim 8, wherein the instructions for obtaining the animation vector include instructions for determining the animation vector by sensing facial features, associated with independent targets, of a human subject.

10. The article of manufacture of claim 8, wherein the instructions for obtaining the animation vector include instructions for obtaining the animation vector by applying facial feature position sensing to annotated vertices on a model.

11. The article of manufacture of claim 8, wherein the targets include independent targets and dependent targets, the machine-readable medium further including instructions stored thereon to generate the dependent targets by linear superposition of vertex coordinates of the independent targets.

12. A system for translating facial animation value to head mesh positions for rendering facial features of an animated avatar, the system comprising:

means for obtaining an animation vector $\underline{a}$ of dimension $N_a$, where $N_a$ is a number of facial animation values in the animation vector;

means for defining groups that associate sets of the animation values with sets of targets;

means for applying a mapping algorithm F independently to each grouped set of animation values to generate corresponding target mix group-vectors;

means for combining the target mix group-vectors to generate a target mix vector $\underline{g}$ of dimension M, where M is a number of targets associated with the head mesh positions; and means for deforming the head mesh position based on the target mix vector $\underline{g}$.

13. An article of manufacture, comprising:

a machine-readable medium having instructions stored thereon that are executable by a processor to translate facial animation values to head mesh positions for rendering facial features of an animated avatar, by:

obtaining an animation vector $\underline{a}$ of dimension $N_a$, where $N_a$ is a number of facial animation values in the animation vector;

defining groups that associate sets of the animation values with sets of targets;

applying a mapping algorithm F independently to each grouped set of animation values to generate corresponding target mix group-vectors;

combining the target mix group-vectors to generate a target mix vector $\underline{g}$ of dimension M, where M is a number of targets associated with the head mesh positions; and deforming the head mesh position based on the target mix vector $\underline{g}$.

14. The article of manufacture of claim 13, wherein the targets include independent targets and dependent targets, the machine-readable medium further including instructions stored thereon to generate the dependent targets by linear superposition of vertex coordinates of the independent targets.

* * * * *